(12) United States Patent
Iwata et al.

(10) Patent No.: US 8,455,384 B2
(45) Date of Patent: Jun. 4, 2013

(54) METHOD FOR PREPARING FUEL CELL ELECTRODE CATALYST AND SOLID POLYMER FUEL CELL

(75) Inventors: Naoko Iwata, Nagoya (JP); Hiroaki Takahashi, Toyota (JP); Peter Bogdanoff, Berlin (DE); Sebastian Fiechter, Berlin (DE); Iris Herrmann-Geppert, Berlin (DE); Ulrike Kramm, Berlin (DE)

(73) Assignees: Toyota Jidosha Kabushiki Kaisha, Toyota-shi, Aichi-ken (JP); Helmholtz-Zentrum Berlin Fuer Materialien und Energie GmbH, Berlin (DE)

( * ) Notice: Subject to any disclaimer, the term of this patent is extended or adjusted under 35 U.S.C. 154(b) by 106 days.

(21) Appl. No.: 13/056,362

(22) PCT Filed: Jul. 29, 2008

(86) PCT No.: PCT/JP2008/063935
§ 371 (c)(1),
(2), (4) Date: Jan. 28, 2011

(87) PCT Pub. No.: WO2010/013353
PCT Pub. Date: Feb. 4, 2010

(65) Prior Publication Data
US 2011/0130270 A1   Jun. 2, 2011

(51) Int. Cl.
*H01M 4/88* (2006.01)
*B01J 23/00* (2006.01)
*B01J 23/38* (2006.01)
*B01J 23/40* (2006.01)
*B01J 23/42* (2006.01)
*B01J 23/44* (2006.01)
*B01J 23/46* (2006.01)
*B01J 23/74* (2006.01)

(52) U.S. Cl.
USPC .......... 502/101; 502/325; 502/326; 502/349; 502/352

(58) Field of Classification Search
USPC .......................... 502/101, 325, 326, 349, 352
IPC .............. H01M 4/88; B01J 23/00,23/38, 23/40, B01J 23/42, 23/46, 23/74
See application file for complete search history.

(56) References Cited

U.S. PATENT DOCUMENTS 4,299,682 A * 11/1981 Oda et al. ...................... 204/265
2004/0236157 A1 11/2004 Heilgendorff et al.
(Continued)

FOREIGN PATENT DOCUMENTS

EP 0 026 617 A1 4/1981
JP 52028498 * 3/1977
(Continued)

OTHER PUBLICATIONS

Hermann et al., Oxalate supported pyrolysis of CoTMPP as electrocatalysts for the oxygen reduction reaction, Electrochimica Acta, 2009, 54(18), 4275-4287.*
(Continued)

*Primary Examiner* — Jun Li
(74) *Attorney, Agent, or Firm* — Finnegan, Henderson, Farabow, Garrett & Dunner, LLP (57) ABSTRACT

According to the present invention, the catalyst performance of a chelate catalyst comprising a complex of a macrocyclic compound such as a porphyrin derivative is improved. Also, the following method is provided: a method for preparing a fuel cell electrode catalyst comprising a nitrogen-containing metal complex in which a metallic element is coordinated with a macrocyclic organic compound, such method comprising the steps of: adding tin oxalate to the nitrogen-containing metal complex; and baking a mixture of the nitrogen-containing metal complex and tin oxalate in an inert gas atmosphere, wherein elution of metal tin is carried out via acid treatment.

7 Claims, 7 Drawing Sheets

U.S. PATENT DOCUMENTS

| | | | |
|---|---|---|---|
| 2006/0280677 A1* | 12/2006 | Hagemeyer et al. | 423/648.1 |
| 2008/0107956 A1* | 5/2008 | Yoo et al. | 429/41 |
| 2008/0286490 A1 | 11/2008 | Bogdanoff et al. | |
| 2009/0048096 A1 | 2/2009 | Iwata et al. | |
| 2010/0190643 A1* | 7/2010 | Hugener-Campbell et al. | 502/350 |

FOREIGN PATENT DOCUMENTS

| | | |
|---|---|---|
| JP | 56084713 A * | 7/1981 |
| JP | 2005-230648 | 9/2005 |
| JP | 2006-314871 | 11/2006 |
| WO | WO 03/004156 A2 | 1/2003 |
| WO | WO 2006/086979 A2 | 8/2006 |
| WO | WO 2007/105810 A1 | 9/2007 |

OTHER PUBLICATIONS

International Search Report in International Application No. PCT/JP2008/063935; Mailing Date: Dec. 11, 2008.

International Preliminary Report on Patentability in International Application No. PCT/JP2008/063935; Mailing Date: Sep. 30, 2010.

Applicant's Reply in International Application No. PCT/JP2008/063935; Responsive to Notification dated Dec. 11, 2008.

* cited by examiner

Optimization of material composition (without US, only acid treatment)

Fig. 6

Optimization of material composition (with acid treatment in US bath)

Fig. 7

METHOD FOR PREPARING FUEL CELL ELECTRODE CATALYST AND SOLID POLYMER FUEL CELL

CROSS-REFERENCE TO RELATED APPLICATIONS

This application is a national phase application of International Application No. PCT/JP2008/063935, filed Jul. 29, 2008, the contents of which are incorporated herein by reference.

TECHNICAL FIELD

The present invention relates to a method for preparing a fuel cell electrode catalyst having excellent oxygen reduction activity. Further, the present invention relates to a solid polymer fuel cell in which the electrode catalyst is contained in a catalyst layer of an electrode.

BACKGROUND ART

A catalyst used to promote a reaction is essential for a solid polymer electrolyte fuel cell. Platinum and platinum alloys have been mainly examined as catalysts that can be used in both hydrogen and oxygen electrodes. A large overvoltage is generated particularly in an oxygen electrode (cathode). In order to reduce such overvoltage, it would be possible to increase the amount of supported platinum or platinum alloy that is used as a catalyst. However, such increase in the catalyst amount is not effective enough to cause overvoltage reduction. On the other hand, the problem of cost increase along with an increase in the catalyst amount is further intensified. Thus, it has been a major objective to strike a balance between cost and catalyst performance.

As an aside, a complex of a macrocyclic compound containing metal such as porphyrin (PP), phthalocyanine (Pc), or tetraazaannulene (TAA) has been examined as a catalyst that has oxygen-reducing ability. The basic idea is that such complex of a metal macrocyclic compound has the capacity to adsorb oxygen molecules so that such capacity can be utilized and applied to a reaction for electrochemically reducing oxygen molecules. It would be possible to apply, as a catalyst, such nitrogen-containing-platinum-based complex having a PtN4 chelate structure in which platinum (Pt) is coordinated with 4 nitrogen atoms to a practical electrode.

For instance, WO2003/004156 filed by the present applicant discloses a platinum-free chelate catalyst containing metal porphyrin. In addition, in WO2003/004156, the chelate catalyst comprises a nitrogen-containing organic transition metal complex, which contains a transition metal that differs from the aforementioned transition metal, and a chalcogen component, in addition to at least one unsupported transition metal salt. It is described that when an unsupported transition metal salt is used as a filler during carbon matrix formation, a highly porous material is formed upon thermal decomposition of the salt due to the forming effect. Patent Document 1 discloses, in the Examples, a nitrogen-containing organic transition metal complex, in which cobalt tetramethoxyphenylporphyrin (CoTMPP) serving as metal porphyrin, sulfur serving as a chalcogen component, and an unsupported iron oxalate serving as transition metal salt were used. In such case, Fe contained in iron oxalate reacted with sulfur such that iron sulfide was formed, followed by acid elution. Thus, sulfur, which serves as a chalcogen component, is an essential component in WO2003/004156.

DISCLOSURE OF THE INVENTION

Problem to be Solved by the Invention

In the case of the chelate catalyst comprising a complex of a macrocyclic compound such as a porphyrin derivative described in WO2003/004156, a salt of an unsupported transition metal functions as a "foaming agent" for a nitrogen-containing organic transition metal complex. Accordingly, it is thought that a carbon matrix becomes porous and thus the activity surface area is extended, contributing to an improvement in catalyst activity.

However, a chelate catalyst comprising a complex of a macrocyclic compound such as a porphyrin derivative described in WO2003/004156 is problematic in terms of the following (a) and (b): (a): a foaming agent (pore-forming material) cannot be completely removed; (b): the pore size is not optimized. Therefore, further improvement in catalyst activity has been awaited.

Thus, it is an objective of the present invention to improve the catalyst performance of a chelate catalyst comprising a complex of a macrocyclic compound such as a porphyrin derivative described in WO2003/004156.

Means for Solving the Problem

The present inventors focused on the impossibility of achieving sufficient pore formation with the use of a "forming agent" used for a conventional chelate catalyst comprising a complex of a macrocyclic compound such as a porphyrin derivative. Accordingly, they have found that sufficient pore formation can be achieved by carrying out a specific treatment with the use of a specific compound. This has led to the completion of the present invention.

Specifically, firstly, the present invention relates to a method for preparing a fuel cell electrode catalyst comprising a nitrogen-containing metal complex in which a metallic element is coordinated with a macrocyclic organic compound, such method comprising the steps of: adding tin oxalate to the nitrogen-containing metal complex; and baking a mixture of the nitrogen-containing metal complex and tin oxalate in an inert gas atmosphere (hereafter to be referred to as the $1^{st}$ baking). Tin oxalate functions as a pore-forming material and becomes metal tin when reduced via baking. At such time, tin oxalate also forms pores in a substrate comprising a nitrogen-containing metal complex. Thus, an electrode catalyst material having a large specific surface area can be obtained.

According to the present invention, elution of metal tin is carried out via acid treatment following the step of baking a mixture of the above nitrogen-containing metal complex and tin oxalate. As a result, metal tin generated from tin oxalate removed, and thus catalyst activity can be further improved. In such case, it is preferable to carry out ultrasound irradiation upon elution of metal tin or before or simultaneously such elution such that removal of the metal tin is promoted and thus the pore size can be adequately adjusted.

In addition, according to the present invention, it is preferable to carry out baking at least once (hereafter to be referred to as, for example, the $2^{nd}$ baking) in an atmosphere containing $N_2$ and $H_2$ following the aforementioned elution of metal tin for the improvement of catalyst activity.

Further, it is preferable to further carry out elution of metal tin via acid treatment or to carry out acid treatment and ultrasonication in combination following the above step of $2^{nd}$ baking in an atmosphere containing $N_2$ and $H_2$ for the improvement of catalyst activity.

Preferred examples of the above nitrogen-containing metal complex include a nitrogen-containing metal complex in which at least one transition metal selected from the group consisting of cobalt (Co), iron (Fe), nickel (Ni), zinc (Zn), copper (Cu), manganese (Mn), and palladium (Pd) is coordinated with at least one nitrogen-containing macrocyclic compound selected from the group consisting of porphyrin (PP) and derivatives thereof, phthalocyanine (Pc) and derivatives thereof, and tetraazaannulene (TAA) and derivatives thereof.

In addition, the above nitrogen-containing metal complex is not limited to the above transition metal complex. Thus, it may be a nitrogen-containing metal complex comprising a platinum-based element. Specifically, preferred examples thereof include a nitrogen-containing metal complex in which a platinum-based element or a platinum-based element combined with other elements, which serves as a metal, is coordinated with at least one nitrogen-containing macrocyclic compound selected from the group consisting of porphyrin (PP) and derivatives thereof, phthalocyanine (Pc) and derivatives thereof, and tetraazaannulene (TAA) and derivatives thereof.

Secondly, the present invention relates to a solid polymer fuel cell comprising a fuel cell electrode catalyst prepared by the above method.

Effects of the Invention

When a mixture of tin oxalate that serves as a pore-forming material and a nitrogen-containing macrocyclic compound is baked, porous parts are adequately formed in a catalyst substrate such that the catalyst substrate has a high specific surface area. Thus, catalyst activity can be improved. Accordingly, a fuel cell electrode catalyst having excellent properties can be obtained. In particular, the current density in a high electric potential region can be improved in the case of such catalyst.

BEST MODE FOR CARRYING OUT THE INVENTION

The following is a schematic view of a nitrogen-containing metal complex in which a metallic element is coordinated with a macrocyclic organic compound. A transition metal, a platinum-based element, or a platinum-based element combined with other elements, which serves as the main element (M), is coordinated with 4 nitrogen atoms in a macrocyclic organic compound such that a complex of a macrocyclic compound (MCC) is formed.

Preferred examples of a macrocyclic organic compound used in the present invention that constitutes a metal complex include the following compounds having the N4-chelate structure: porphyrin and derivatives thereof; phthalocyanine and derivatives thereof; azaporphyrin and derivatives thereof; tetraazaannulene and derivatives thereof; and a Schiff base.

The following chemical formulae are examples of a nitrogen-containing metal complex in which a metallic element is coordinated with a macrocyclic organic compound. In the examples porphyrin and a derivative thereof are used.

(where M represents a transition metal element, a platinum-based metallic element, or a platinum-based element combined with other elements, and $R^1$ to $R^{12}$ each represent hydrogen or a substituent);

(where M represents a transition metal element, a platinum-based metallic element, or a platinum-based element combined with other elements, and $R^{13}$ to $R^{22}$ each represent hydrogen or a substituent); and (where M represents a transition metal element, a platinum-based metallic element, or a platinum-based element combined with other elements, and $R^{23}$ to $R^{36}$ each represent hydrogen or a substituent).

According to the present invention, a nitrogen-containing metal complex in which a metallic element is coordinated with a macrocyclic organic compound may be carried on a support. Even without the use of a support, such complex can exhibit catalyst performance. A macrocyclic organic compound used in the present invention is carbonized via baking so as to serve as a carrier, and thus a support is not necessarily used, which is advantageous. In a case in which a carrier is used, the conductive carrier used is not particularly limited. Examples thereof include carbon black, carbon nanotube, and carbon nanofiber.

EXAMPLES

Hereafter, the present invention is described based on the Examples and the Comparative example.

Example 1

Preparation of Co/Sn Catalysts

A cobalt complex catalyst (hereafter to be referred to as Co/Sn) in which pores were formed were prepared from cobalt tetramethoxyphenylporphyrin (CoTMPP) and tin oxalate as described below.
1. Mixing of cobalt tetramethoxyphenylporphyrin (CoTMPP) and tin oxalate with a mortar
2. Baking in an inert gas atmosphere (750° C., 45 min)
3. Cooling of the resultant, followed by 12 h in a 1 M hydrochloric acid aqueous solution (with ultrasound dispersion for 30 min)
4. Filtration, washing, and drying
5. Ultrasound dispersion in $H_2O$ at 10° C. for 30 min-6 h
6. Addition of the resultant to a 1 M hydrochloric acid aqueous solution (12 h) (with ultrasound dispersion for 30 min-2 h)
7. Filtration, washing, and drying
8. Baking at 750° C. in an $N_2/H_2$ atmosphere
9. After cooling down, addition of the resultant to a 1 M hydrochloric acid aqueous solution (12 h) (with ultrasound dispersion for 30 min)
10. Baking at 600° C. for 45 min in an $N_2/H_2$ atmosphere

Comparative Example

Preparation of Co/Fe/S Catalysts

A tetramethoxyphenylporphyrin cobalt complex/iron oxalate/sulfur catalyst (hereafter to be referred to as Co/Fe/S) was prepared as described below in accordance with WO2003/004156.
1. Mixing of cobalt tetramethoxyphenylporphyrin/iron oxalate ($FeC_2O_4.2H_2O$)/S (at a molar ratio of 1:22.7:0.95) with a mortar
2. Baking in an inert gas atmosphere (450° C. for 1 h, 750° C. for 1 h)
3. Cooling of the resultant followed by immersion in 1N hydrochloric acid (12 h)
4. Filtration and washing followed by vacuum drying

[MEA Performance Evaluation]

MEA performance evaluation was carried out by assembling an MEA mixed with Nafion (trade name) serving as a polyelectrolyte under the following conditions.
Gas species: anode: H2; cathode: Air
Cell temperature: anode: 80° C.; cathode: 80° C.
Humidification rate: anode: 75%; cathode: 60%

Figure 1:
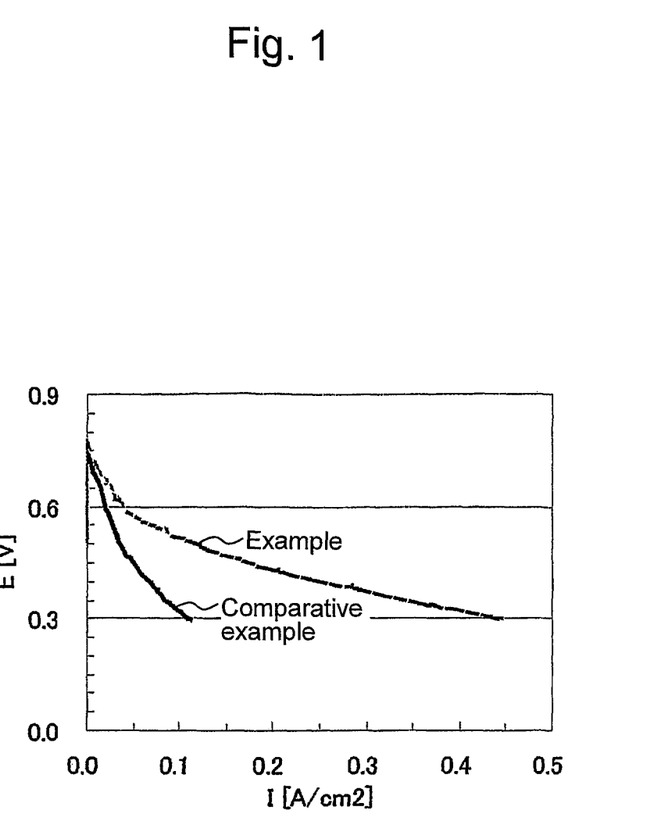
FIG. 1 shows power generation performance results based on RDE evaluation in the case of the Co/Sn catalyst of the present invention (Example 1) and that in the case of a Co/Fe/S catalyst obtained by a conventional method (Comparative example).

FIG. 1 shows power generation performance results based on RDE evaluation in the case of the Co/Sn catalyst of the present invention (Example 1) and in the case of a Co/Fe/S catalyst obtained by a conventional method (Comparative example).

As is apparent from the results shown in FIG. 1, power generation performance can be improved, particularly in a high electric potential region, by carrying out a baking treatment with the use of tin oxalate as a pore forming material.

Example 2

Optimization of a Temperature for the $1^{st}$ Baking

Different Co/Sn catalysts were prepared in the manner described in Example 1 by changing the baking temperature when baking a mixture of cobalt tetramethoxyphenylporphyrin (CoTMPP) and tin oxalate ($SnC_2O_4$) in an inert gas atmosphere. The obtained catalysts were subjected to performance evaluation.

Figure 2:
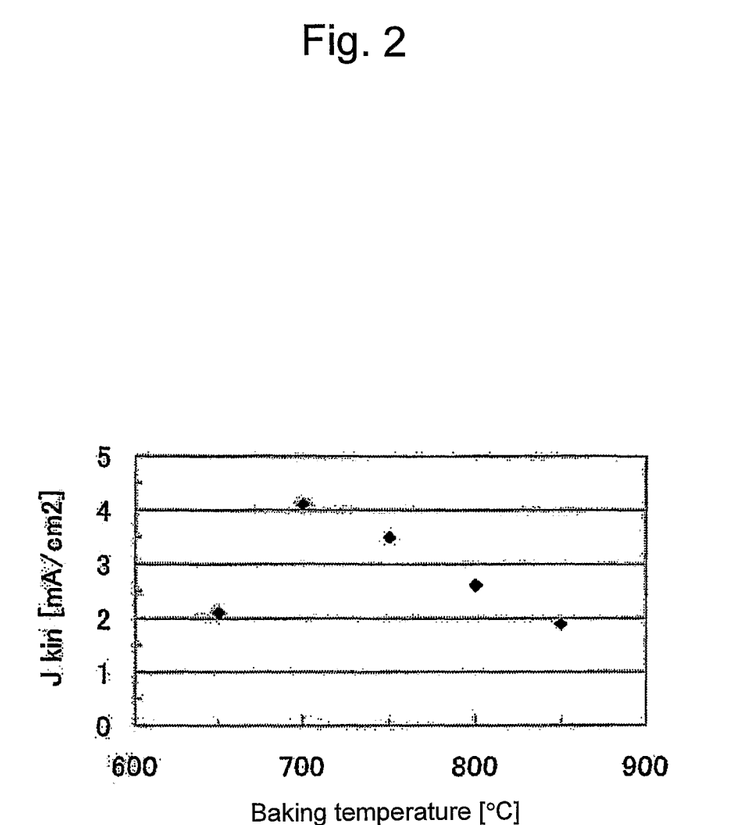
FIG. 2 shows the results of performance evaluation of different Co/Sn catalysts prepared by changing the baking temperature when baking a mixture of cobalt tetramethoxyphenylporphyrin (CoTMPP) and tin oxalate in an inert gas atmosphere.

FIG. 2 shows the results of performance evaluation. As is apparent from the results shown in FIG. 2, the optimal baking temperature range is 660° C. to 800° C.

Example 3

Gas Species Used for the $2^{nd}$ Baking

Different Co/Sn catalysts were prepared in the manner described in Example 1 by carrying out the $1^{st}$ baking of a mixture of cobalt tetramethoxyphenylporphyrin (CoTMPP) and tin oxalate ($SnC_2O_4$) in an inert gas atmosphere with or with an acid treatment and changing gas species upon the $2^{nd}$ baking. The obtained catalysts were subjected to performance evaluation.

Figure 3:
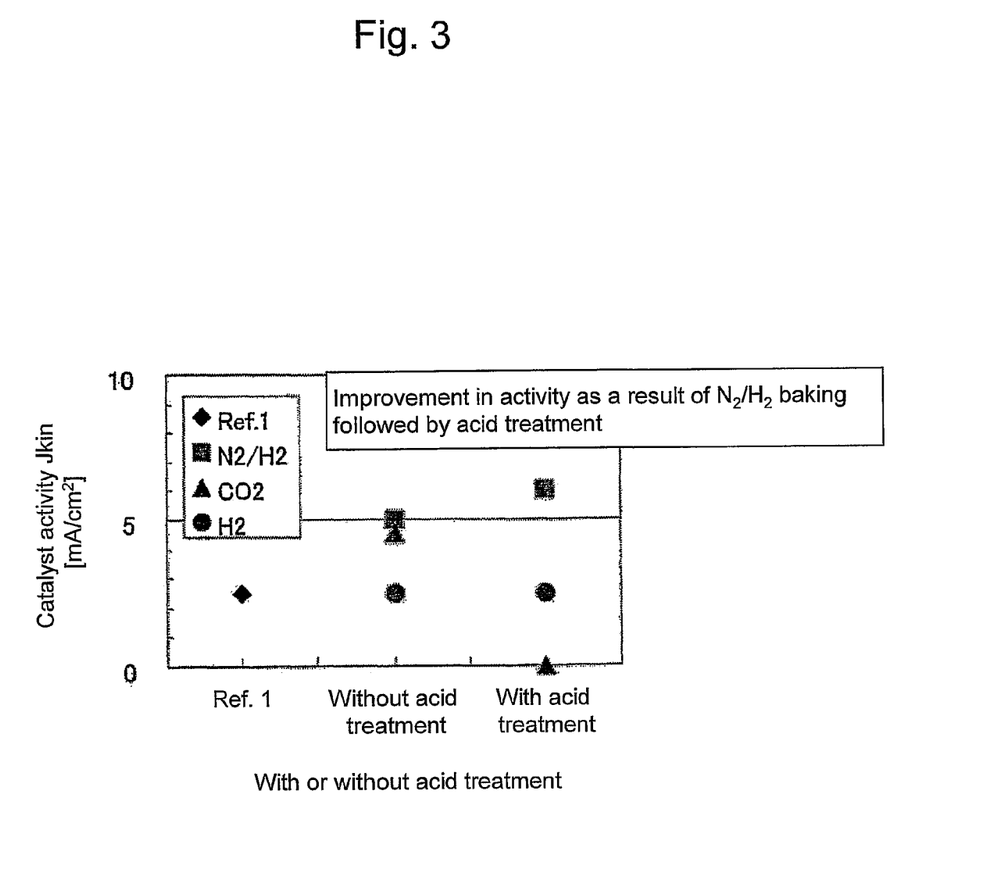
FIG. 3 shows the results of performance evaluation of different Co/Sn catalysts prepared by carrying out the $1^{st}$ baking followed by acid treatment (initial catalyst, Ref. 1) and followed by $2^{nd}$ backing with changing gas species without acid treatment (labeled without acid treatment) or followed by acid treatment (labeled; with acid treatment). Ref. 1: catalyst prepared following the step 1 to 4 of the preparation procedure.

FIG. 3 shows the results of performance evaluation of different Co/Sn catalysts prepared by carrying out the $1^{st}$ baking with acid treatment and followed by a second backing in changing gas species. In FIG. 3, Ref. 1 refers to a catalyst prepared following the preparation steps 1 to 4 of the example.

Figure 4:
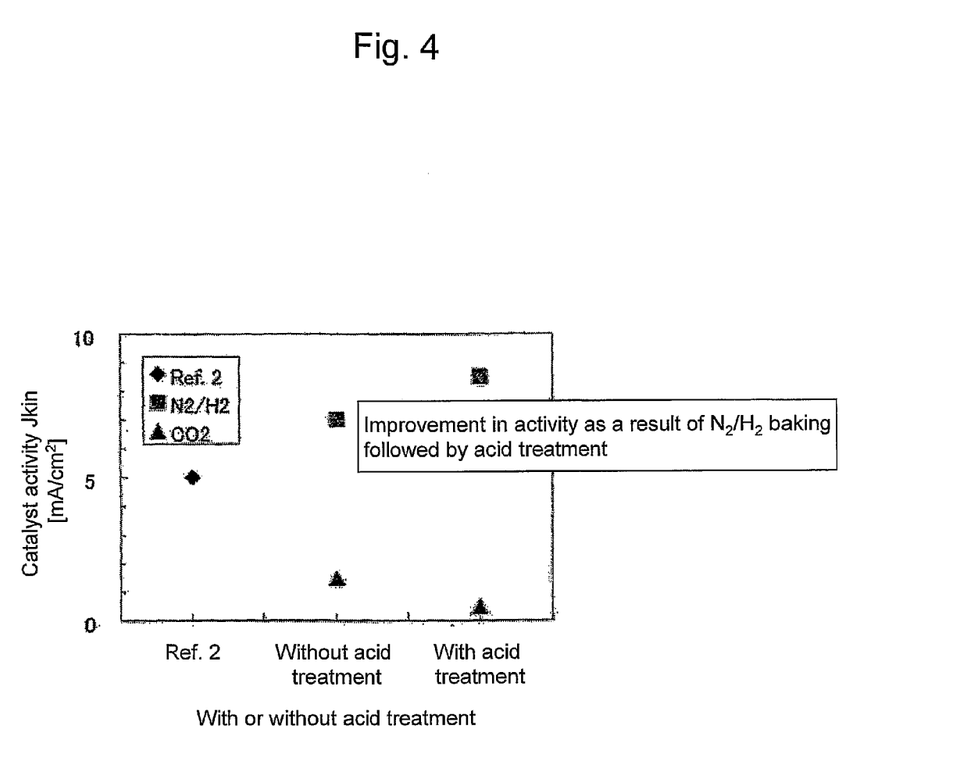
FIG. 4 shows the results of performance evaluation of different Co/Sn catalysts prepared by carrying out the $1^{st}$ baking followed by acid treatment and changing gas species upon the $2^{nd}$ baking. Ref. 2: catalyst prepared following the step 1 to 7 of the preparation procedure.

FIG. 4 shows the results of performance evaluation of different Co/Sn catalysts prepared by carrying out the $1^{st}$ baking with acid treatment and followed by a second baking in changing gas species. In FIG. 4 Ref. 2: catalyst was prepared following the preparation steps 1 to 7 of the example.

Based on the results of FIGS. 3 and 4, the effectiveness of ultrasound dispersion (step5 to 7 of the preparation), the $N_2/H_2$ baking (step8) and acid treatment (step9) are understood.

Example 4

Optimization of the Porphyrin/Tin Oxalate Ratio

Different Co/Sn catalysts were prepared in the manner described in Example 1 by changing the mixing ratio of cobalt tetramethoxyphenylporphyrin (CoTMPP) to tin oxalate. The obtained catalysts were subjected to performance evaluation.

Figure 5:
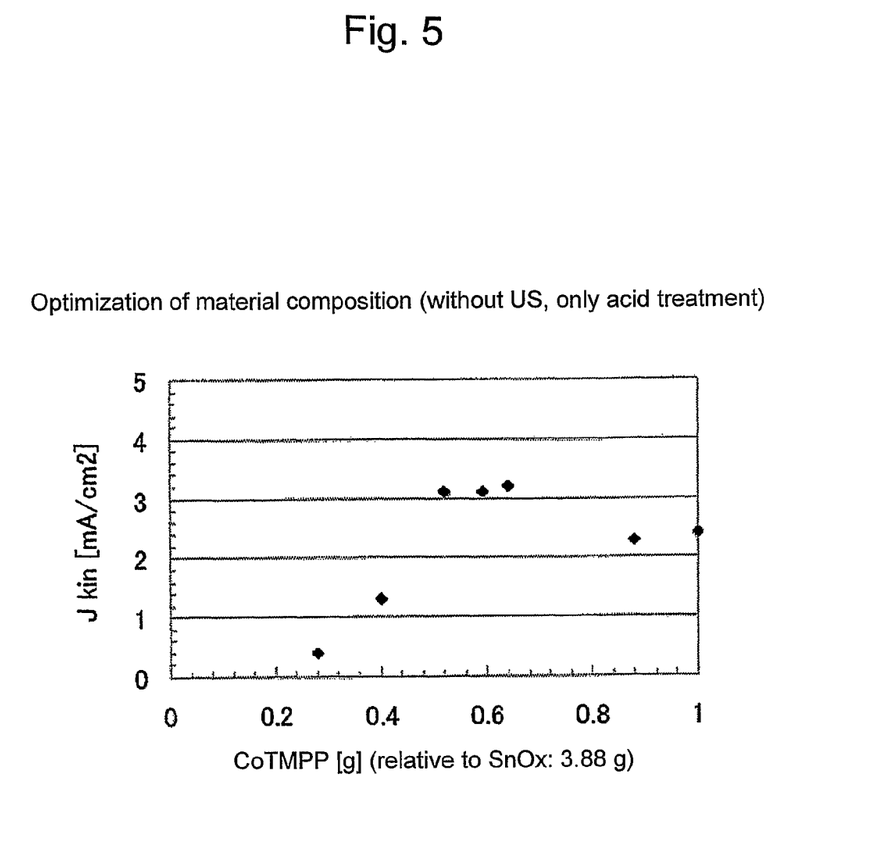
FIG. 5 shows the results of performance evaluation of different Co/Sn catalysts subjected to acid treatment without ultrasonication, such catalysts each having a different mixing ratio.
Figure 6:
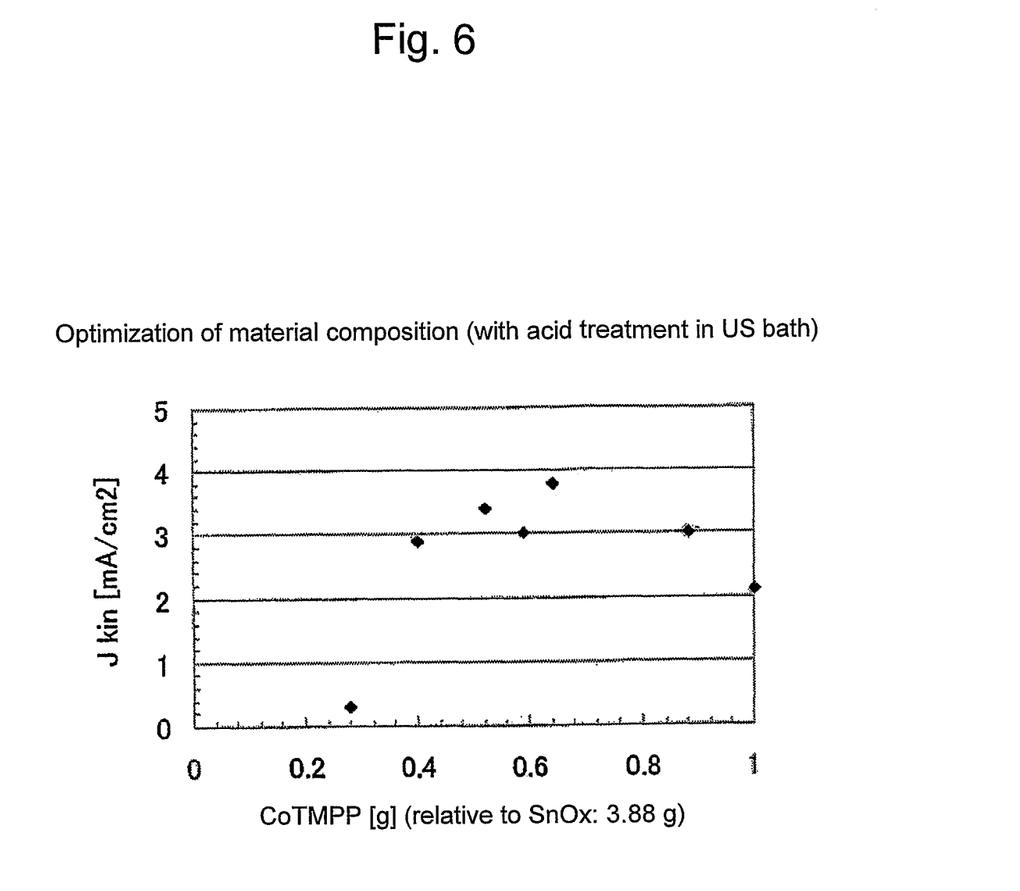
FIG. 6 shows the results of performance evaluation of different Co/Sn catalysts subjected to ultrasonication during the acid treatment, such catalysts each having a different mixing ratio.

FIG. 5 shows the results of performance evaluation of different Co/Sn catalysts, each having a different mixing ratio. Catalyst preparation followed the preparation procedure steps 1 to 4 but without ultrasonic dispersion named in step 3. In addition, FIG. 6 shows the results of performance evaluation of different Co/Sn catalysts, each having a different mixing ratio. Catalyst preparation followed the preparation procedure steps 1 to 4 but with ultrasonic dispersion named in step 3.

As is apparent from FIG. 5, the optimal range of CoTMPP is 0.5 to 0.8 g or more relative to 3.88 g of tin oxalate in the case without ultrasonication. In addition, as is apparent from the results of FIG. 6, the optimal range of CoTMPP is 0.5 to 0.9 g relative to 3.88 g of tin oxalate in the case involving ultrasonication.

Example 5

Effectiveness of Acid Treatment and of Ultrasonication

As Reference material a Co/Sn catalysts subjected to acid treatment in an ultrasonic bath (steps 1 to 4 of the preparation procedure) and one subjected additional to an ultrasonification step (step 5 to 7 in the preparation procedure) were used.

Figure 7:
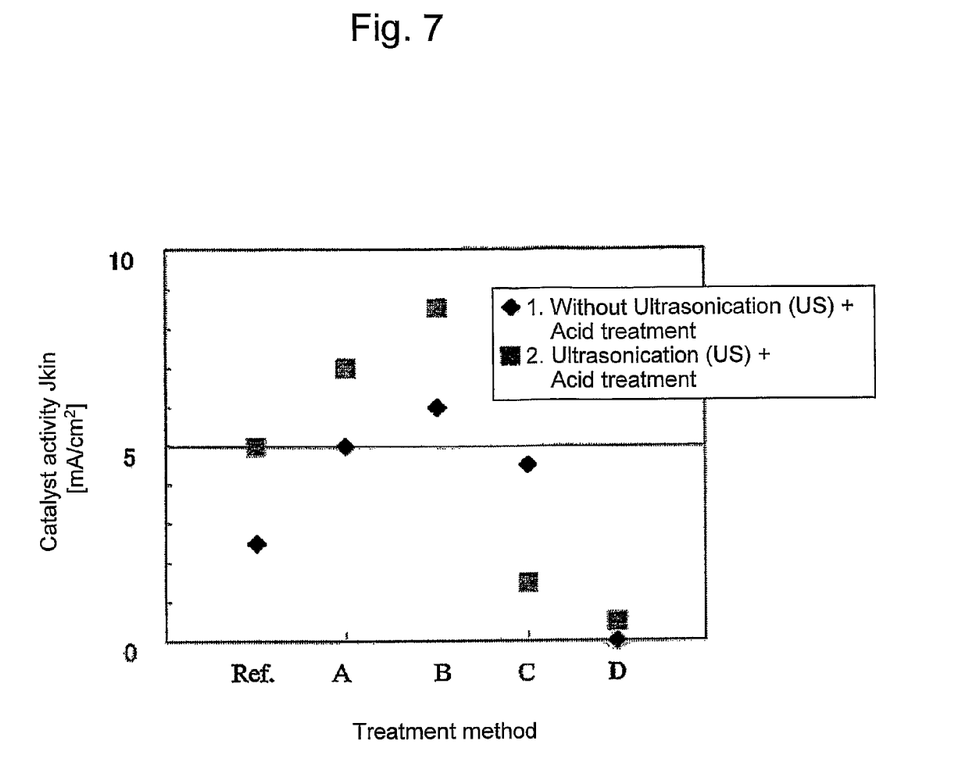
FIG. 7 shows the results of performance evaluation of catalyst prepared using a $2^{nd}$ baking in different gas species (A and B: $N_2/H_2$; C and D $CO_2$) and followed by an acid treatment in some cases (B and D). Catalysts are compared to reference catalyst where Co/Sn catalyst was prepared by carrying out $1^{st}$ baking followed by acid treatment where 30 min were performed in an ultrasonic bath followed by filtration, washing drying and a second reference Co/Sn catalyst was prepared by carrying out the $1^{st}$ baking followed by an acid treatment where 30 min where performed in ultrasonic bath followed by filtration, washing and drying and followed by an ultrasonic dispersion in $H_2O$ using an ultrasonic stick.

FIG. 7 shows the results of performance evaluation of these reference catalysts and different $2^{nd}$ baking in changing atmospheres with or without an acid treatment. In the case of treatment method A, the $2^{nd}$ baking was carried out in an $N_2/H_2$ atmosphere at 750° C. for 30 min. In the case of a treatment method B, the $2^{nd}$ baking was carried out in an $N_2/H_2$ atmosphere at 750° C. for 30 min, followed by a treatment with 1 M HCl. In the case of a treatment method C, the $2^{nd}$ baking was carried out in a $CO_2$ atmosphere at 750° C. for 30 min. In the case of a treatment method D, the $2^{nd}$ baking was carried out in a $CO_2$ atmosphere at 750° C. for 30 min, followed by a treatment with 1 M HCl.

As is apparent from the results shown in FIG. 7, the catalyst activity is preferably improved as a result of ultrasonication and acid treatment (steps 5 to 7). In particular, it is understood that performance improvement is significantly observed in the case of baking in an $N_2/H_2$ atmosphere followed by an acid treatment.

Based on the above findings, it is thought that the currently best mode for preparation of a Co/Sn catalyst is as follows.
1. Mixing 0.64 g of cobalt tetramethoxyphenylporphyrin (CoTMPP) and 3.88 of tin oxalate ($SnC_2O_4$) in a mortar
2. Baking in an inert gas atmosphere (750° C., 45 min)
3. Cooling of the resultant, followed by 12 h in a 1 M hydrochloric acid aqueous solution (with ultrasound dispersion for 30 min)
4. Filtration, washing, and drying
5. Ultrasound dispersion in $H_2O$ at 10° C. for 30 min-6 h
6. Addition of the resultant to a 1 M hydrochloric acid aqueous solution (12 h) (with ultrasound dispersion for 30 min-2 h)
7. Filtration, washing, and drying
8. Baking at 750° C. in an $N_2/H_2$ atmosphere
9. After cooling down, addition of the resultant to a 1 M hydrochloric acid aqueous solution (12 h) (with ultrasound dispersion for 30 min), followed by filtration, washing and drying
10. Baking at 600° C. for 45 min in an $N_2/H_2$ atmosphere

INDUSTRIAL APPLICABILITY

According to the present invention, a fuel cell electrode catalyst having excellent properties can be obtained. In particular, the current density in a high electric potential region can be improved in the case of such catalyst. Thus, the present invention contributes to improvement in fuel cell power generation characteristics.

The invention claimed is:

1. A method for preparing a fuel cell electrode catalyst comprising a nitrogen-containing metal complex in which a metallic element is coordinated with a macrocyclic organic compound, such method comprising the steps of adding tin oxalate as pore forming material to the nitrogen-containing metal complex, baking a mixture of the nitrogen-containing metal complex and tin oxalate in an inert gas atmosphere and elution of generated metal tin is carried out.

2. The method for preparing a fuel cell electrode catalyst according to claim 1, wherein elution of generated metal tin is carried out in an acid treatment.

3. The method for preparing a fuel cell electrode catalyst according to claim 2, wherein ultrasound irradiation is carried out upon the elution of metal tin in an acid treatment.

4. The method for preparing a fuel cell electrode catalyst according to claim 2, wherein baking is carried out at least once in an atmosphere containing $N_2$ and $H_2$ following the elution of metal tin in an acid treatment.

5. The method for preparing a fuel cell electrode catalyst according to claim 1, wherein the nitrogen-containing metal complex is a nitrogen-containing metal complex in which at least one transition metal selected from the group consisting of cobalt (Co), iron (Fe), nickel (Ni), zinc (Zn), copper (Cu), manganese (Mn), and palladium (Pd) is coordinated with at least one nitrogen-containing macrocyclic compound selected from the group consisting of porphyrin (PP) and derivatives thereof, phthalocyanine (Pc) and derivatives thereof, and tetraazaannulene (TAA) and derivatives thereof.

6. The method for preparing a fuel cell electrode catalyst according to claim 1, wherein the nitrogen-containing metal complex is a nitrogen-containing metal complex in which a platinum-based element or a platinum-based element combined with other elements, which serves as a metal, is coordinated with at least one nitrogen-containing macrocyclic compound selected from the group consisting of porphyrin (PP) and derivatives thereof, phthalocyanine (Pc) and derivatives thereof, and tetraazaannulene (TAA) and derivatives thereof.

7. The method for preparing a fuel cell electrode catalyst according to claim 1, wherein the nitrogen-containing metal complex is a nitrogen-containing metal complex in which cobalt (Co) is coordinated with porphyrin (PP) or derivatives thereof.

* * * * *